US009628498B1

(12) United States Patent
Aziz et al.

(10) Patent No.: US 9,628,498 B1
(45) Date of Patent: *Apr. 18, 2017

(54) SYSTEM AND METHOD FOR BOT DETECTION

(71) Applicant: FireEye, Inc., Milpitas, CA (US)

(72) Inventors: Ashar Aziz, Fremont, CA (US); Wei-Lung Lai, Cupertino, CA (US); Jayaraman Manni, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,632

(22) Filed: Oct. 11, 2013

Related U.S. Application Data

(63) Continuation of application No. 11/998,603, filed on Nov. 30, 2007, now Pat. No. 8,561,177, and a continuation of application No. 11/494,990, filed on Jul. 28, 2006, now Pat. No. 8,375,444, which is a continuation-in-part of application No. 11/471,072, filed on Jun. 19, 2006, now Pat. No. 8,584,239, which is a continuation-in-part of application No. 11/409,355, filed on Apr. 20, 2006, now Pat. No. 8,171,553, which is a continuation-in-part of application No. 11/096,287, filed on Mar. 31, 2005, now Pat. No. 8,528,086, and a continuation-in-part of application No. 11/151,812, filed on Jun. 13, 2005, now Pat. No. 8,549,638, and a continuation-in-part of
(Continued)

(51) Int. Cl.
*G06F 21/00* (2013.01)
*H04L 29/06* (2006.01)

(52) U.S. Cl.
CPC ................ *H04L 63/1408* (2013.01)

(58) Field of Classification Search
CPC ..... G06F 21/00; H04L 63/1408; H04L 63/14; H04L 63/1416; H04L 63/1425
See application file for complete search history.

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 1/2008
GB 2490431 A 10/2012
(Continued)

OTHER PUBLICATIONS

Cisco, *Configuring the Catalyst Switched Port Analyzer (SPAN)* (*"Cisco"*), (1992-2003, Cisco Systems).
(Continued)

*Primary Examiner* — Saleh Najjar
*Assistant Examiner* — Devin Almeida
(74) *Attorney, Agent, or Firm* — Rutan & Tucker, LLP

(57) ABSTRACT

Exemplary systems and methods for detecting a communication channel of a bot. In exemplary embodiments, presence of a communication channel between a first network device and a second network device is detected. Data from the communication channel is scanned and used to determine if a suspected bot communication exists. If a bot communication is detected, then a recovery process may be initiated.

43 Claims, 6 Drawing Sheets

Related U.S. Application Data application No. 11/152,286, filed on Jun. 13, 2005, now Pat. No. 8,006,305.

(60) Provisional application No. 60/868,323, filed on Dec. 1, 2006, provisional application No. 60/559,198, filed on Apr. 1, 2004, provisional application No. 60/579,953, filed on Jun. 14, 2004, provisional application No. 60/579,910, filed on Jun. 14, 2004.

(56) References Cited

U.S. PATENT DOCUMENTS

| | | |
|---|---|---|
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 * | 7/2006 | Pak .................. H04L 63/1441 726/23 |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 * | 3/2010 | Sobchuk et al. ................. 726/23 |
| 7,698,548 B2 * | 4/2010 | Shelest et al. ................. 713/154 |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |

(56) References Cited

U.S. PATENT DOCUMENTS

| | | | |
|---|---|---|---|
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1* | 12/2002 | Shevenell et al. ............ 713/201 |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1* | 4/2004 | Spiegel et al. ............ 714/43 |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1* | 8/2006 | Benjamin ............ 726/23 |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |

(56) References Cited

U.S. PATENT DOCUMENTS

| | | |
|---|---|---|
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1* | 4/2008 | Hoeflin et al. .......... 370/395.42 |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0054278 A1 | 3/2010 | Stolfo et al. |
| 2010/0115621 A1 | 5/2010 | Staniford et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0281541 A1 | 11/2010 | Stolfo et al. |
| 2010/0281542 A1 | 11/2010 | Stolfo et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |

(56) References Cited

U.S. PATENT DOCUMENTS

| | | |
|---|---|---|
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | WO-02/06928 | 1/2002 |
| WO | WO-02/23805 | 3/2002 |
| WO | 2007117636 A2 | 10/2007 |
| WO | WO-2008/041950 | 4/2008 |
| WO | 2011084431 A2 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Excerpt regarding First Printing Date for Merike Kaeo, Designing Network Security ("Kaeo"), (Copyright 2005).

The Sniffer's Guide to Raw Traffic available at: yuba.stanford.edu/~casado/pcap/section1.html, (Jan. 6, 2014).

"Network Security: NetDetector—Network Intrusion Forensic System (NIFS) Whitepaper", "NetDetector Whitepaper"), (Copyright 2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.jsp?reload=true&arnumber=990073, (Dec. 7, 2013).

Adetoye, Adedayo, et al., "Network Intrusion Detection & Response System", ("Adetoye"), (Sep. 2003).

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol. Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Kaeo, Merike, "Designing Network Security", ("Kaeo"), (Nov. 2003).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"),.

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Liljenstam, Michael, et al., "Simulating Realistic Network Traffic for Worm Warning System Design and Testing", Institute for Security Technology studies, Dartmouth College, ("Liljenstam"), (Oct. 27, 2003).

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Natvig, Kurt, "SANDBOXII: Internet", Virus Bulletin Conference, ("Natvig"), (Sep. 2002).

Newsome, J., et al., "Dynamic Taint Analysis for Automatic Detection, Analysis, and Signature Generation of Exploits on Commodity Software", In Proceedings of the 12th Annual Network and Distribution System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Peter M. Chen, and Brian D. Noble, "When Virtual Is Better Than Real, Department of Electrical Engineering and Computer Science", University of Michigan ("Chen").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating Design and Implementation, San Francisco, California, (Dec. 2004).

Spitzner, Lance, "Honeypots: Tracking Hackers", ("Spizner"), (Sep. 17, 2002).

Thomas H. Ptacek, and Timothy N. Newsham, "Insertion, Evasion, and Denial of Service: Eluding Network Intrusion Detection", Secure Networks, ("Ptacek"), (Jan. 1998).

(56) References Cited

OTHER PUBLICATIONS

Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
Abdullah, et al., Visualizing Network Data for Intrusion Detection, 2005 IEEE Workshop on Information Assurance and Security, pp. 100-108.
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier". Http://www.altavista.com/web/results?Itag=ody&pg=aq &aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq &aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
Deutsch, P. , "Zlib compressed data format specification version 3.3" RFC 1950, (1996).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http:// www.informationweek-.com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorter, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/ files/conference/ usenixsecurity12/sec12- -final107.pdf [retrieved on Dec. 15, 2014].
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
NetBIOS Working Group. Protocol Standard for a NetBIOS Service on a TCP/UDP transport: Concepts and Methods. STD 19, RFC 1001, Mar. 1987.
Oberheide et al., CloudAV.sub.—N-Version Antivirus in the Network Cloud, 17th USENIX Security Symposium USENIX Security 'Jul. 28, 2008-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR BOT DETECTION

CROSS-REFERENCE TO RELATED APPLICATIONS

This application is a continuation of U.S. patent application Ser. No. 11/998,605, filed Nov. 30, 2007, which claims benefit of provisional patent application No. 60/868,323, filed Dec. 1, 2006, entitled, "Detecting Command & Control Communication Channels of Botnets", and is a continuation-in-part of U.S. patent application Ser. No. 11/494,990, filed Jul. 28, 2006, entitled "Dynamic Signature Creation and Enforcement", which is a continuation-in-part of U.S. patent application Ser. No. 11/471,072, filed Jun. 19, 2006, entitled "Virtual Machine with Dynamic Data Flow Analysis", which is a continuation-in-part of U.S. patent application Ser. No. 11/409,355, filed Apr. 20, 2006, entitled "Heuristic Based Capture with Replay to Virtual Machine", which is a continuation-in-part of U.S. patent application Ser. No. 11/096,287, filed Mar. 31, 2005, entitled "System and Method of Detecting Computer Worms", and is a continuation-in-part of U.S. patent application Ser. No. 11/151,812, filed Jun. 13, 2005, entitled "System and Method of Containing Computer Worms," and is a continuation-in-part of U.S. patent application Ser. No. 11/152,286, filed Jun. 13, 2005, entitled "Computer Worm Defense System and Method; U.S. patent application Ser. No. 11/096,287 claims the benefit of U.S. Provisional Application No. 60/559,198 filed on Apr. 1, 2004, U.S. patent application Ser. No. 11/151,812 claims the benefit of U.S. Provisional Application No. 60/579,953 filed on Jun. 14, 2004, and U.S. patent application Ser. No. 11/152,286 claims the benefit of U.S. Provisional Application No. 60/579,910 filed on Jun. 14, 2004, all of which are incorporated by reference herein.

This application is related to U.S. patent application Ser. No. 11/998,750, filed on Nov. 30, 2007, and entitled "Systems and Methods for Detecting Encrypted Bot Command & Control Channels."

The above-referenced related patent application is also incorporated by reference herein.

BACKGROUND OF THE INVENTION

Field of the Invention

The present invention relates generally to network security and more particularly to detecting command and control communication channels of a bot.

Background Art

Presently, malicious software (i.e., malware) can attack various devices via a network. For example, malware may include any program or file that is harmful to a computer user, such as bots, computer viruses, worms, Trojan horses, spyware, or any programming that gathers information about a computer user or otherwise operates without permission. Various processes and devices have been employed to prevent the problems that malware can cause.

For example, computers often include antivirus scanning software that scans a particular client device for viruses. The scanning may be performed based on a schedule specified by a user associated with the particular computer, a system administrator, and so forth. Unfortunately, by the time a virus is detected by the scanning software, some damage on the particular computer may have already occurred.

Another option for preventing malware is a honey pot. A honey pot is a computer system on the Internet that is expressly set up to attract and "trap" an illicit user that attempts to penetrate another's computer system. The illicit user can include a hacker, a cracker, or a script kiddy, for example. The honey pot records the activities associated with the invasion of the computer system. Disadvantageously, as the honey pot is being invaded, so too are other users' computer systems on the same network. Thus, other users' computer systems may be harmed while the honey pot determines the nature of the malware invading the honey pot's own computer system.

In some instances, malware comprises a bot. A bot is a software robot configured to remotely control all or a portion of a digital device (e.g., a computer) without authorization by the digital device's user. Bot related activities include bot propagation and attacking other computers on a network. Bots commonly propagate by scanning nodes (e.g., computers or other digital devices) available on a network to search for a vulnerable target. When a vulnerable computer is scanned, the bot may install a copy of itself. Once installed, the new bot may continue to seek other computers on a network to infect.

A bot may also, without the authority of the infected computer user, establish a command and control communication channel to receive instructions. Bots may receive command and control communication from a centralized bot server or another infected computer (e.g., via a peer-to-peer (P2P) network established by a bot on the infected computer).

The bot may receive instructions to perform bot related activities. When a plurality of bots (i.e., a botnet) act together, the infected computers (i.e., zombies) can perform organized attacks against one or more computers on a network. In one example, bot infected computers may be directed to ping another computer on a network in a denial-of-service attack. In another example, upon receiving instructions, one or more bots may direct the infected computer to transmit spam across a network.

A bot may also receive instructions to transmit information regarding the infected host computer. In one example, the bot may be instructed to act as a keylogger and record keystrokes on the infected host computer. The bot may also be instructed to search for personal information and email addresses of other users contained in an email or contacts file. This information may be transmitted to one or more other infected computers or a user in command of the bot or botnet.

SUMMARY OF THE INVENTION

Systems and methods for detecting a command and control communication channel of a bot are provided. In exemplary embodiments, presence of a communication channel between a first network device and a second network device is detected.

Data from the communication channel is scanned and used to determine if a suspected bot communication exists. Several different methods may be utilized to detect a command and control (C&C) communication within the communication channel. In one embodiment, a fingerprint module may scan for a bot oriented command communications in an IRC channel. In one example, the fingerprint module scans for commands or messages that indicate that an IRC channel is being established. In an alternative embodiment, a port module may monitor for communications originating from a non-standard port. In a further embodiment, a virtual machine may be utilized to detect C&C communication channels either in a replay virtual machine environment or in a direct entry virtual machine environment. Accordingly, intercepted or replayed network data obtained from the communication channel is transmitted to the virtual machine, and the virtual machine response is then analyzed to determine if the virtual machine is infected. In some embodiments, an analysis environment may wait for an outbound domain name system (DNS) request, which may also identify the C&C channel. A pseudo-DNS server in the virtual machine can respond to the request with an IP address mapped to an internal-to-virtual machine-analysis pseudo-server. The outbound IRC or web request made to the supplied IP address may confirm the C&C channel.

If a bot communication is detected, then a recovery process may be initiated. In one embodiment, during the recovery process, the devices that are suspected as being infected may be flagged and/or proper users and administrators notified. For example, icons associated with nodes coupled to a network may be color coded based on their association with any infection propagation, command and control communication with a bot, and/or bot attack. In another embodiment, a router (i.e., switch) may be configured to direct all data from a bot server (e.g., from the source IP address of the bot server) to a controller. As a result, all the network data from the bot server, not only that which is transmitted to the network device, may be intercepted.

DESCRIPTION OF EXEMPLARY EMBODIMENTS

Figure 1:
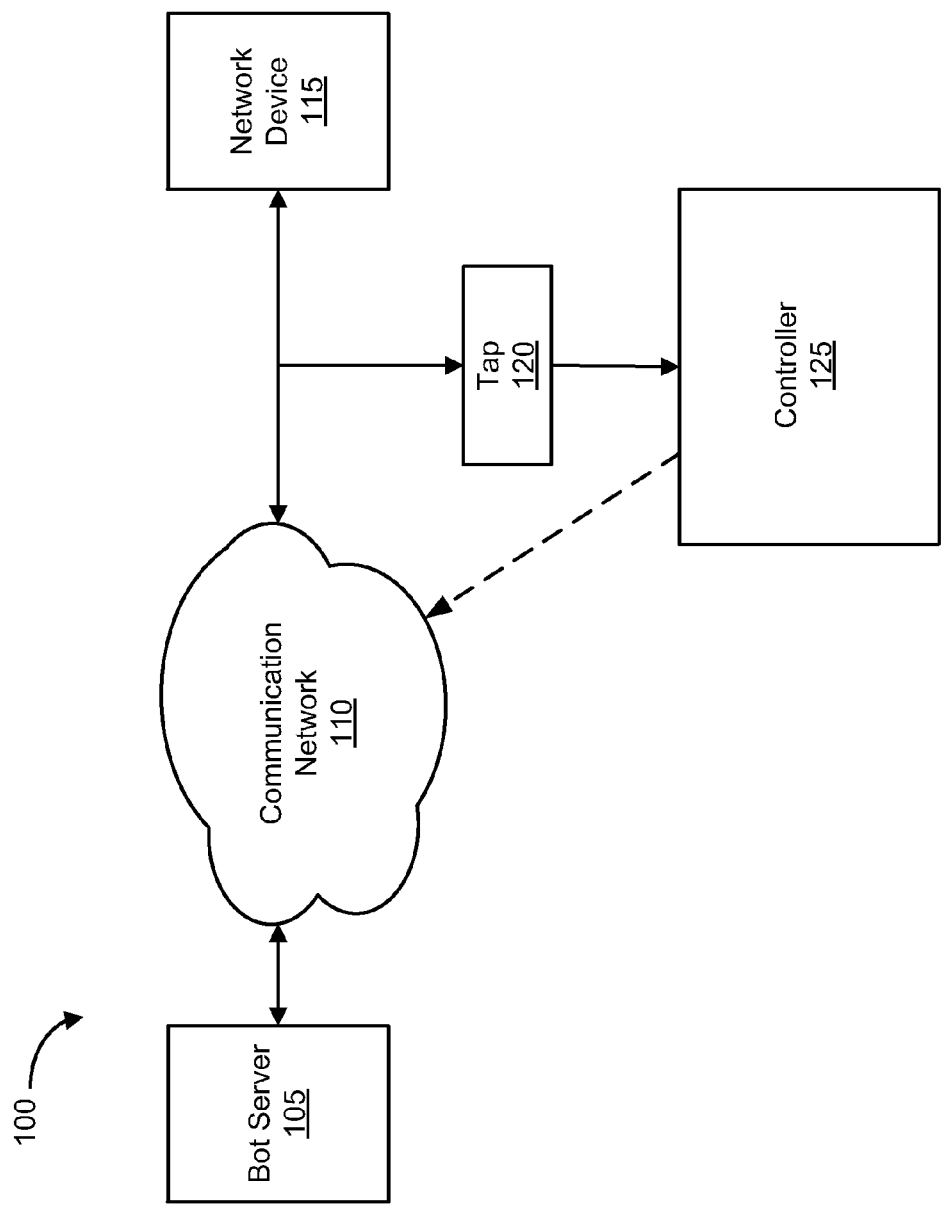
FIG. 1 is a diagram of a channel detection environment in which embodiments of the present invention may be practiced.

Exemplary systems and methods for detection of a command and control communication channel of a bot are provided. The bot running on a compromised device may be part of a plurality of software robots (e.g., a botnet) which run autonomously on a collection of compromised devices under a common command and control (C&C) infrastructure. In one example, a bot on the compromised device may open an Internet Relay Chat (IRC) channel with another device to receive commands. This IRC channel may be referred to as a C&C communication channel.

In some embodiments, the communication channel detection system may comprise a dynamic honey pot. A dynamic honey pot can monitor network traffic to detect the presence of a C&C communication channel. If a C&C channel or a suspected C&C channel is detected, then the network data from the C&C communication channel may be intercepted. In exemplary embodiments, the network traffic does not need to be directly transmitted to the dynamic honey pot. Rather, the dynamic honey pot can detect possible bot infection attempts or command and control communication with an existing bot on other devices on the network. Upon detection, the dynamic honey pot can then intercept future network data.

In exemplary embodiments, network data from a communication network may be copied and analyzed. If a C&C channel or a suspected C&C channel is detected, related network data may be intercepted. The intercepted network data may continue to be analyzed. If the intercepted network data comprises a network attack, command and control communication, and/or an attempt to propagate the bot, an unauthorized activity signature configured to identify the activity and/or bot may be generated.

The bot compromises one or more compromised devices which may send spam and malware, such as viruses, worms, or Trojan horses, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm may duplicate itself in a computer so many times that it causes the computer to crash. A Trojan horse is a destructive program disguised as a game, utility, or application. When run by a user or computer program, a Trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses to a website that hosts the adware and/or spyware. The user is often unaware that these programs have been added and are similarly unaware of the adware and/or spyware's function.

FIG. 1 is a diagram of a channel detection environment 100 in which embodiments of the present invention may be practiced. The channel detection environment 100 may comprise a bot server 105 in communication via a communication network 110 with a network device 115. Additionally, a tap 120 may be coupled to the communication network 110. The tap 120 may be further coupled to a controller 125. Optionally, a router (not shown) may be provided for re-routing data from the communication network 110.

The bot server 105 and the network device 110 comprise digital devices. A digital device comprises any device with a processor. Some examples of digital devices include computers, servers, laptops, personal digital assistants, and cellular telephones. The bot server 105 is configured to transmit network data over the communication network 110 to the network device 115, which is configured to receive the network data. In some embodiments, the bot server 105 may establish a C&C communication channel with the network device 115 via the communication network 110. The C&C communication channel may be utilized by the bot server 105 to control a bot on the node or the node itself on the network device 115.

The bot server 105 may attempt to control the network device 115 by transmitting instructions or a bot to the network device 115. In one example, the bot server 105 is a computer controlled by an illicit user to control one or more bots or one or more network devices 115 through the use of bots. In another example, the bot server 105 is a network device similar to the network device 115; the bot server 105 may be a part of a P2P communication network for transmitting instructions to a bot on another digital device. In this example, once infected, the network device 115 may be a part of a P2P communication network whereby the network device 115 may transmit instructions to another network device similar to a bot server 105.

The tap 120 may comprise a digital data tap configured to monitor network data and provide a copy of the network data to the controller 125. In some embodiments, the tap 120 comprises a span port. The network data comprises signals and data that are transmitted over the communication network 110 including data flows from the bot server 105 to the network device 115. As discussed herein, the network data may include command and control instructions transmitted from the bot server 105. In one example, the tap 120 copies the network data without an appreciable decline in performance of the bot server 105, the network device 115, or the communication network 110. The tap 120 may copy any portion of the network data. For example, the tap 120 can receive and copy any number of data packets of the network data. In exemplary embodiments, the tap 120 can monitor and copy data transmitted from multiple devices without appreciably affecting the performance of the communication network 110 or the devices coupled to the communication network 110. In various embodiments, the tap 120 can sample the network data based on a sampling scheme.

The tap 120 can also capture metadata from the network data. The metadata can be associated with the bot server 105 and/or the network device 115. In one example, the metadata may identify the bot server 105 and/or the network device 110. In some embodiments, the bot server 105 transmits metadata, which is captured by the tap 120. In other embodiments, a heuristic module, described in more detail below, can detect the bot server 105 and/or the network device 110 by analyzing data packets within the network data and generate the metadata.

The communication network 110 may comprise a public computer network such as the Internet, a private computer network such as a wireless telecommunication network, wide area network, local area network, or any other type of network enabled to provide communications between coupled devices.

Although FIG. 1 depicts data transmitted from the bot server 105 to the network device 115, either device can transmit and receive data from the other device. Similarly, although only one bot server 105, communication network 110, network device 115, tap 120, and controller 125 are depicted in FIG. 1, there may be any number of bot servers 105, communication networks 110, network devices 115, taps 120, and controllers 125.

The controller 125 may comprise a processor and/or software configured to receive and analyze network data for the presence of network data sent via the C&C communication channel. In exemplary embodiments, the controller 125 receives network data over the tap 120. If the controller 125 detects commands within network data that potentially establishes a C&C communication channel, the controller 125 may intercept the associated network data. In one example, the controller 125 may intercept network data from the same data flow as that which potentially established the C&C communication channel. In another example, the controller 125 may intercept all network data from a node on the communication network that either received or sent the commands (e.g., the bot server 105 and the network device 115). When network data is intercepted, the network data is no longer received by the intended recipient but rather is received by the controller 125. In some embodiments, the associated network data is intercepted when network data is flagged as suspicious.

In some embodiments, the controller 125 can organize the network data into one or more data flows. Data flows can then be reconstructed based on the network data samples received from the tap. The controller 125 is further discussed in more detail in connection with FIG. 3.

Figure 2:
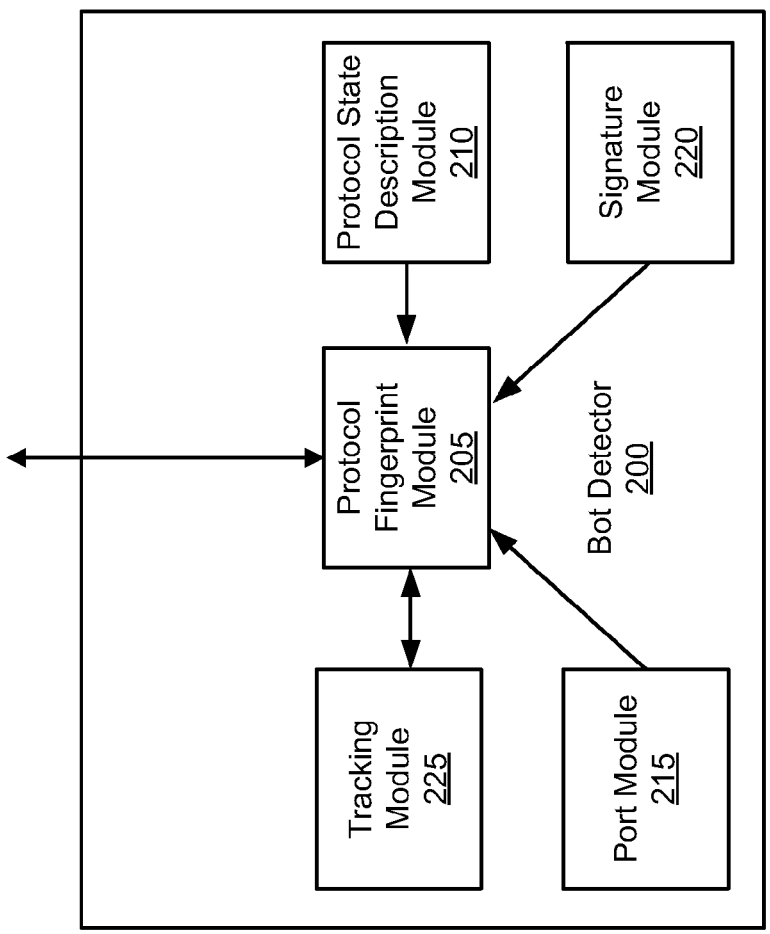
FIG. 2 is a block diagram of an exemplary bot detector implementing some embodiments of the present invention.

FIG. 2 is a block diagram of an exemplary bot detector 200 implementing some embodiments of the present invention. In various embodiments, the bot detector 200 may be coupled to or comprised within the controller 125. In other embodiments, the bot detector 200 is coupled to the communication network 110. In various embodiments, the bot detector 200 is software that is loaded on a digital device. For example, the bot detector 200 may be provided to a user for installation onto their LAN or a network device (e.g., network device 115).

The exemplary bot detector 200 may comprise a protocol fingerprint module 205, a protocol state description module 210, a port module 215, a signature module 220, and a tracking module 225. Alternative embodiments may comprise more, less, or functionally equivalent modules.

In various embodiments, the use of an IRC protocol is used for bot command and control. Therefore, detecting the existence or establishment of an IRC channel in the network may indicate a possible botnet C&C communication channel. In one embodiment, the protocol fingerprint module 205 is utilized to detect an IRC C&C channel. The exemplary protocol fingerprint module 205 may comprise input/output related behavior that uniquely identifies a protocol implementation (e.g., version number, feature, vendor, etc.). In some embodiments, a network trace may map routes between the bot server 105 and the network device 115.

In exemplary embodiments, network data is scanned to detect a bot oriented IRC command, such as .advscan and SCAN, to highlight IRC channels to a potential bot server 105. Stateful protocol fingerprinting analysis by the protocol fingerprint module 205 may be performed to detect bot oriented commands in the IRC channels. For example, instead of simply scanning for .advscan in an input stream, the protocol fingerprint module 205 may first look for an IRC channel establishment (e.g., JOIN and JOIN confirm commands), and then scan for an .advscan message.

In some embodiments, the protocol fingerprinting module 205 may be extensible to other protocols via protocol feature description using protocol state descriptions provided by the protocol state description module 210 and regular expressions. A description of the IRC protocol is made possible using this technique. For example, if the protocol state description module 210 determines that the protocol being used is IRC, the protocol fingerprint module 205 may be configured by the protocol state description module 210 to detect IRC commands.

In various embodiments, the signature module 220 provides signatures which identify bot related behavior, known bot servers 105, suspected bot servers, mechanisms to block attacks, mechanisms to block bot propagation, and/or mechanisms that remove bots from network devices 115.

These signatures may be provided to the protocol fingerprint module 205 and/or the controller 125 to take corrective action.

By correlating infection propagation with C&C communication activity, a higher degree of confidence can be ascribed to a suspected bot list. For example, if traffic is observed on a suspected IRC C&C channel and immediately thereafter there is discovery of infection propagation from the IRC server (e.g., bot server 105 or network device 115) that provided the C&C communication, then all nodes that have communicated to the same IRC server are highly suspect. This broadens the visibility of infected systems from those that are observed actively propagating infections to systems that have not been observed actively propagating but have been in communication with a confirmed active bot server 105.

Furthermore, detection of a central C&C server allows authorities and system administrators to take the central C&C server offline and/or block communications with the central C&C server. Once the C&C server has been neutralized, the bots that may otherwise receive commands from the C&C server are no longer controlled and are, in some examples, unable to function.

However, because the bot server 105 may be easily neutralized by shutting down the central C&C server, botnets controlled using a Peer-to-Peer (P2P) communications protocol have been developed. Due to the distributed nature of P2P communication channel, it becomes much harder to shut down a P2P controlled botnet.

In various embodiments, detection of a P2P C&C channel may be performed by the port module 215 detecting communications on a seldom used (non-standard) port. During base-lining, standard well-known ports are marked. For example, all well known ports and services in a network environment may be categorized as "standard." A standard list may be compiled and stored by the port module 215. In exemplary embodiments, the standard list may comprise all ports defined in Internet RFCs as well as ports and services used by standard versions of Windows and Linux.

In some embodiments, the port module 215 may "learn" standard ports through observation of network data on a communication network 110. In one example, the software on multiple network devices 115 may transmit and receive network data on a variety of ports. The network data is received by the controller 125 and the port module 215 may update the standard list based on the ports of the network devices 115 that receive and transmit data over a predetermined period of time.

Any port not on the standard list may be considered a non-standard port. In some embodiments, the port module 215 will mark a number of nodes communicating over a non-standard port over a predetermined period of time a P2P communications channel when the number of nodes is over some threshold (e.g., 3 or 4 nodes). In one example, the port module 215 will mark a potential P2P communications channel when four network devices 115 communicate with each other over a non-standard port within 4 seconds.

These nodes do not need to be communicating on the same port, as long as the ports are seldom used non-standard ports. For example, the port module 215 may detect P2P chains that use a different port for each leg of the chain. In some embodiments, the time difference between anomaly propagation in the chain may be assumed to be small (e.g., less than 10 seconds). This short time difference allows the tracking module 225 to track various nodes without running into resource constraint issues. In one example, the tracking module 225 identifies network devices 115 that communicate with other network devices 115 over the predetermined period of time. The port module 215 may identify those network devices 115 communicating over non-standard ports. Once the port module 215 detects a network device 115 communicating over a non-standard port, the port module 215 may check the tracking module 225 to determine if any other network device 115 has been communicating over non-standard ports.

In other embodiments, the tracking module 225, tracks the source and destination of at least some communications over the communication network 110. If a bot server 105 or a potential bot server is detected, the tracking module 225 can provide a list of network devices 115 in communication with the bot server 105 or the potential bot server. In one example, the tracking module 225 can provide a list of nodes in communication with a suspected bot server 105 over a predetermined period of time.

While existence of a P2P channel is not conclusive evidence of a botnet, network operators may benefit from notification of P2P communications on their networks. If a P2P communication can be correlated to infection propagation via one or more nodes of the P2P chain, then all nodes of the P2P network may become highly suspect as members of a P2P controlled botnet.

In exemplary embodiments of the present invention, systems may be marked in order to identify infections. For example, any nodes that are not associated with any infection propagation may be placed in a yellow category. These nodes (e.g., network devices 115) may be considered "nodes of interest." Nodes in an IRC or P2P network where at least one of the nodes (e.g., in a chain of nodes) is observed propagating an infection may be placed in, for example, an orange category. Nodes that are observed to be actively propagating an infection may be placed in a red category. Any nodes that have not been categorized as yellow, orange, or red may be assigned to a green category. In various embodiments, icons associated with nodes may be colored and/or associated with a color category.

Figure 3:
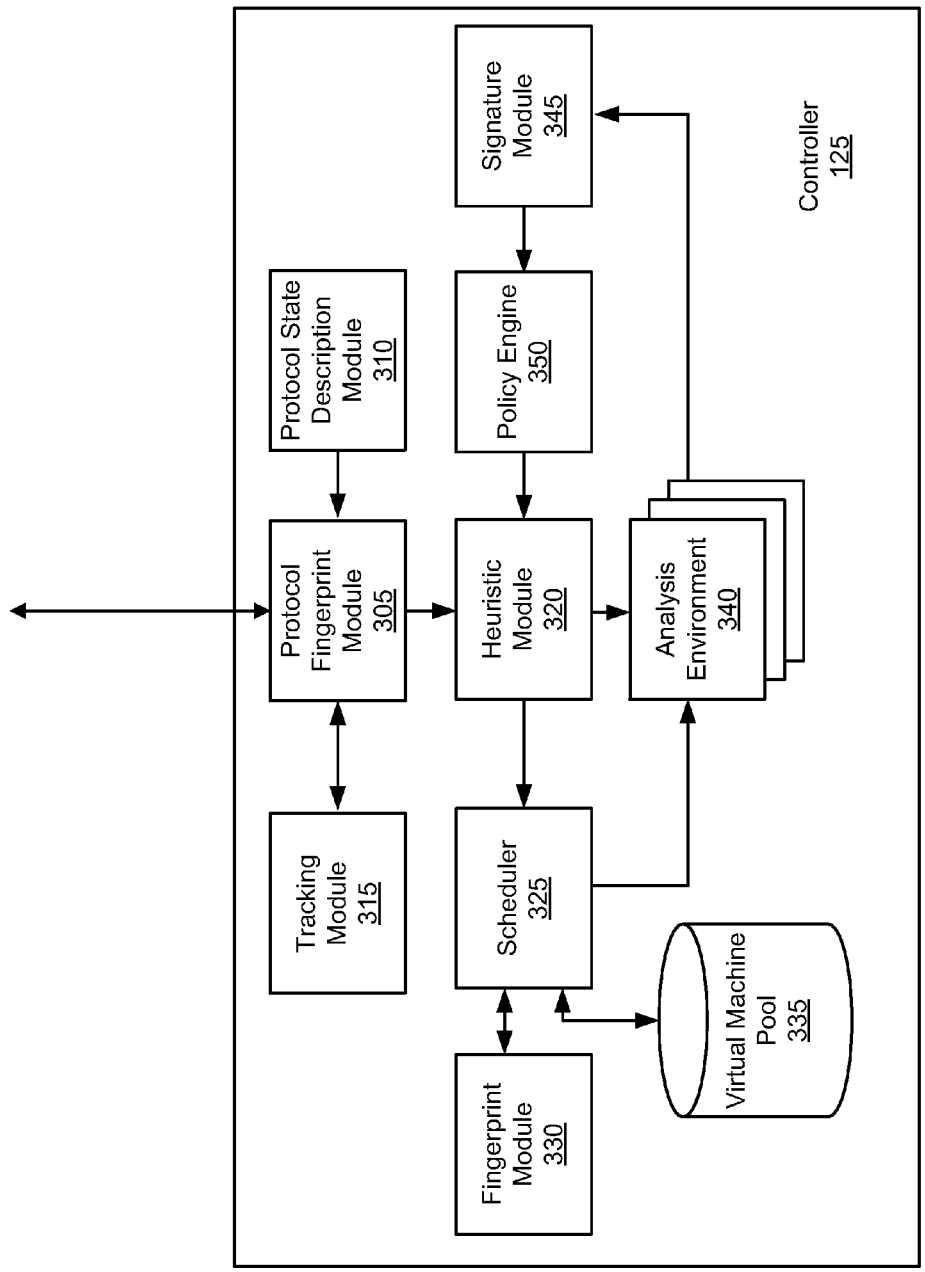
FIG. 3 is a block diagram of an exemplary controller implementing some embodiments of the present invention.

FIG. 3 is a block diagram of an exemplary controller 125 implementing embodiments of the present invention. The controller 125 may be any digital device or software that receives network data. The exemplary controller 125 may comprise bot detection components similar to the bot detector 200 of FIG. 2 including a protocol fingerprint module 305, a protocol state description module 310, and a tracking module 315. In this example, the functions of the tracking module 225 (FIG. 2) and the port module 215 (FIG. 2) are combined.

The controller 125 may further comprise a heuristic module 320, a scheduler 325, a fingerprint module 330, a virtual machine pool 335, an analysis environment 340, a signature module 345, and a policy engine 350. In some embodiments, the controller 125 comprises a tap which is further coupled to the communication network 110. In other embodiments, the controller 125 is coupled to an external tap 120 or may be directly coupled to the communication network 110.

The exemplary heuristic module 320 may receive a copy of network data from the communication network 110. The heuristic module 320 applies heuristics and/or probability analysis to determine if the network data may contain suspicious activity (such as bot related activity). In one example, the heuristic module 320 flags network data as suspicious. The network data can then be buffered and organized into a data flow. The data flow is then provided to the scheduler 325. In some embodiments, the network data is provided directly to the scheduler 325 without buffering or organizing the data flow.

The heuristic module 320 can perform any heuristic and/or probability analysis. In some embodiments, once a C&C communication channel has been detected or suspected, analysis may be performed to confirm and/or verify the C&C channel. Once the protocol fingerprint module 305 identifies a potential C&C communication channel, network data from the channel is forwarded to the scheduler 325.

In other embodiments, the heuristic module 320 performs a dark internet protocol (IP) heuristic. A dark IP heuristic can flag network data coming from a bot server 105 that has not previously been identified by the heuristic module 320. The dark IP heuristic can also flag network data going to an unassigned IP address. In an example, an attacker scans random IP addresses of a network to identify an active server or workstation. The dark IP heuristic can flag network data directed to an unassigned IP address.

The heuristic module 320 can also perform a dark port heuristic. A dark port heuristic can flag network data transmitted to an unassigned or unusual port address. Such network data transmitted to an unusual port can be indicative of a port scan by a worm, hacker, or bot. Further, the heuristic module 320 can flag network data from the bot server 105 or network device 115 that is significantly different than traditional data traffic transmitted by the bot server 105 or network device 115. For example, the heuristic module 320 can flag network data from the bot server 105 such as a laptop that begins to transmit network data that is common to a server.

The heuristic module 320 can retain data packets belonging to a particular data flow previously copied by the tap 120. In one example, the heuristic module 320 receives data packets from the tap 120 and stores the data packets within a buffer or other memory. Once the heuristic module 320 receives a predetermined number of data packets from a particular data flow, the heuristic module 320 performs the heuristics and/or probability analysis.

In some embodiments, the heuristic module 320 performs heuristic and/or probability analysis on a set of data packets belonging to a data flow 320 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged network data from the heuristic module 320. The buffer can buffer and organize the flagged network data into one or more data flows before providing the one or more data flows to the scheduler 325. In various embodiments, the buffer can buffer network data and stall before providing the network data to the scheduler 325. In one example, the buffer stalls the network data to allow other components of the controller 125 time to complete functions or otherwise clear data congestion.

The scheduler 325 is a module that identifies the network device 115 to receive the copied network data and retrieves a virtual machine associated with the network device 115. A virtual machine may be software that is configured to mimic the performance of a device (e.g., the network device 115). The virtual machine can be retrieved from the virtual machine pool 335.

In some embodiments, the heuristic module 320 transmits the metadata identifying the network device 115 to receive the copied network data to the scheduler 325. In other embodiments, the scheduler 325 receives one or more data packets of the network data from the heuristic module 320 and analyzes the one or more data packets to identify the network device 115. In yet other embodiments, the metadata can be received from the tap 120.

The scheduler 325 can retrieve and configure the virtual machine to mimic pertinent performance characteristics of the network device 115. In one example, the scheduler 325 configures characteristics of the virtual machine to mimic only those features of the network device 115 that are affected by the network data copied by the tap 120. The scheduler 325 can determine the features of the network device 115 that are affected by the network data by receiving and analyzing the network data from the tap 120. Such features of the network device 115 can include ports that are to receive the network data, select device drivers that are to respond to the network data and any other devices coupled to or contained within the network device 115 that can respond to the network data. In other embodiments, the heuristic module 320 can determine the features of the network device 115 that are affected by the network data by receiving and analyzing the network data from the tap 120. The heuristic module 320 can then transmit the features of the destination device to the scheduler 325.

The optional fingerprint module 330 is configured to determine the packet format of the network data to assist the scheduler 325 in the retrieval and/or configuration of the virtual machine. In one example, the fingerprint module 330 determines that the network data is based on a transmission control protocol/internet protocol (TCP/IP). Thereafter, the scheduler 325 will configure a virtual machine with the appropriate ports to receive TCP/IP packets. In another example, the fingerprint module 330 can configure a virtual machine with appropriate ports to receive user datagram protocol/internet protocol (UDP/IP) packets. The fingerprint module 330 can determine any type of packet format of the network data.

In other embodiments, the optional fingerprint module 330 passively determines a software profile of the network data to assist the scheduler 325 in the retrieval and/or configuration of the virtual machine. The software profile may comprise the operating system (e.g., Linux RH6.2) of the bot server 105 that generated the network data. The determination can be based on analysis of the protocol information of the network data. In an example, the fingerprint module 330 determines that the software profile of network data is Windows XP, SP1. The fingerprint module 330 can then configure a virtual machine with the appropriate ports and capabilities to receive the network data based on the software profile. In other examples, the fingerprint module 330 passes the software profile of the network data to the scheduler 325, and the scheduler 325 either selects or configures the virtual machine based on the profile.

The virtual machine pool 335 is configured to store virtual machines. The virtual machine pool 335 may include any storage capable of storing virtual machines. In one example, the virtual machine pool 335 stores a single virtual machine that can be configured by the scheduler 325 to mimic the performance of any network device, such as the network device 115 on the communication network 110. The virtual machine pool 335 can store any number of distinct virtual machines that can be configured to simulate the performance of any of the network devices 115.

The analysis environment 340 is a module that simulates transmission of unencrypted or decrypted network data between the bot server 105 and the network device 115 to identify the effects of malware or illegitimate computer users (e.g., a hacker, computer cracker, or other computer user) by analyzing the simulation of the effects of the network data upon the network device 115 that is carried out on the virtual machine. In exemplary embodiments, there may be multiple analysis environments 340 in order to simulate multiple network data.

In one example, the analysis environment 340 simulates transmission of the network data between the bot server 105 and the network device 115 to analyze the effects of the network data upon the network device 115 to detect unauthorized activity. As the analysis environment 340 simulates the transmission of the network data, behavior of the virtual machine can be closely monitored for unauthorized activity. If the virtual machine crashes, performs illegal operations, or performs bot related activity, the analysis environment 340 can react. In some embodiments, the analysis environment 340 performs dynamic taint analysis to identify unauthorized activity.

Once unauthorized activity is detected, the analysis environment 340 can generate the unauthorized activity signature configured to identify network data containing unauthorized activity (e.g., malware attacks or bot related activity). Since the unauthorized activity signature does not necessarily require probabilistic analysis to detect unauthorized activity within network data, unauthorized activity detection based on the unauthorized activity signature may be very fast and save computing time.

In various embodiments, the unauthorized activity signature may provide code that may be used to eliminate or "patch" portions of network data containing an attack. Further, in some embodiments, the unauthorized activity signature may be used to identify and eliminate (i.e., delete) the malware causing the attack. The unauthorized activity signature may also be used to configure digital devices to eliminate vulnerabilities (e.g., correct system settings such as disabling active-x controls in a browser or updating an operating system.)

The analysis environment 340 may store the unauthorized activity signature within the signature module 345. The analysis environment 340 may also transmit or command the transmission of the unauthorized activity signature to one or more other controllers 125, bot detectors 200 (e.g., to the signature module 220), network devices 115, switches, and/or servers. By automatically storing and transmitting the unauthorized activity signature, known malware, previously unidentified malware, and the activities of illicit computer users can be quickly controlled and reduced before a computer system is damaged or compromised. The analysis environment 340 is further discussed with respect to FIG. 4.

The signature module 345 receives, authenticates, and stores unauthorized activity signatures. The unauthorized activity signatures may be generated by the analysis environment 340 or another controller 125. The unauthorized activity signatures may then be transmitted to the signature module 345 of one or more controllers 125.

The policy engine 350 coupled to the heuristic module 320 and is a module that can identify network data as suspicious based upon policies contained within the policy engine 350. In one example, the network device 115 can be a computer designed to attract hackers and/or worms (e.g., a "honey pot"). The policy engine 350 can contain a policy to flag any network data directed to the "honey pot" as suspicious since the "honey pot" should not be receiving any legitimate network data. In another example, the policy engine 350 can contain a policy to flag network data directed to any network device 115 that contains highly sensitive or "mission critical" information.

The policy engine 350 can also dynamically apply a rule to copy all network data related to network data already flagged by the heuristic module 320. In one example, the heuristic module 320 flags a single packet of network data as suspicious. The policy engine 350 then applies a rule to flag all data related to the single packet (e.g., associated data flows) as suspicious. In some embodiments, the policy engine 350 flags network data related to suspicious network data until the analysis environment 340 determines that the network data flagged as suspicious is related to unauthorized activity.

The policy engine 350 may scan network data to detect unauthorized activity based upon an unauthorized activity signature. In some embodiments, the policy engine 350 retrieves the unauthorized activity signature from the signature module 345. The network data is then scanned for unauthorized activity based on the unauthorized activity signature.

The policy engine 350 can scan both the header and body of a packet of network data. In some embodiments, the policy engine 350 scans only the header of the packet for unauthorized activity based on the unauthorized activity signature. If unauthorized activity is found, then no further scanning may be performed. In other embodiments, the policy engine 350 scans the packet contents for unauthorized activity.

Unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

If the packet contents or the packet header indicate that the network data contains unauthorized activity, then the policy engine 350, the protocol fingerprint module 305, the heuristic module 320, or the signature module 345 may take action. In one example, the policy engine 350 may generate a rule or command an interceptor module (not shown) to intercept network data from the node that transmitted the network data and delete or bar the packet from the communication network 110. The policy engine 350 and/or the interceptor module may also quarantine, delete, or bar other packets belonging to the same data flow as the unauthorized activity packet.

Based on a determination that the network data is suspicious, the interceptor module can re-route the associated network data to a virtual machine from the virtual machine pool 335. As discussed herein, the heuristic module 320 can provide information that the network data is suspicious. The interceptor module can intercept all of the network data that is initially flagged by the heuristic module 320. The interceptor module can also base the interception of data on the detection of a malware attack by the analysis environment 340 or a policy or signature by the policy engine 350.

The interceptor module can provide the intercepted data to the heuristic module 320 for analysis with a heuristic or to the analysis environment 340 to orchestrate the transmission of the intercepted data to detect a malware attack. If no malware attack is detected, the interceptor module can transmit some or all of the intercepted data to the intended recipient (e.g., network device 115.) If a malware attack is detected within the intercepted data, the unauthorized activity signature may be generated by the signature module 345 and transmitted to one or more controllers 125 or other digital devices.

The interceptor module can redirect network data from the bot server 105 in any number of ways including, but not limited to, configuring a switch, Address Resolution Protocol (ARP) manipulation, or DHCP services.

The interceptor module may send a request to a switch to redirect network data from any bot server 105 to the controller 125. The switch includes any device configured to receive and direct network data between one or more digital devices. Examples of a switch include, but is not limited to, a router, gateway, bridge, and, or server.

In some embodiments, executable code is loaded onto the switch. In one example, the executable code configures the switch to direct network data from any bot server 105 to the controller 125. In another example, the executable code allows the interceptor module to transmit a request to the switch to direct network data from the bot server 105 to the controller 125. In some embodiments, the interceptor module configures the router to intercept network data from the bot server 105 for a predetermined time. The predetermined time may be set by the interceptor module, preloaded into the switch, or configured by a user.

The interceptor module may manipulate dynamic host configuration protocol (DHCP) services to intercept network data. As the bot server 105 transmits network data that is flagged as suspicious or otherwise identified as containing a malware attack. The interceptor module may manipulate DHCP services to assign new IP addresses, associate the controller 125 MAC address with the IP address of the network device 115, or otherwise redirect network data from the bot server 105 to the controller 125.

In various embodiments, the interceptor module can manipulate the DHCP server to configure the bot server 105 with a gateway IP address which is the same as the controller's IP address to send all network data to the controller 125. In other embodiments, the interceptor module may perform DHCP services for the communication network 110 as a DHCP server.

In one example of ARP manipulation, the heuristic module 320 or the interceptor module scans the copied network data flagged as suspicious to identify a source IP address and a target IP address. In this example, the source IP address is the IP address of the bot server 105 and the target IP address is the IP address of the network device 115. In some embodiments, the interceptor module may send an ARP reply to the bot server 105. The ARP reply is configured to identify the MAC address of the controller 125 with the IP address of the network device 115. When the bot server 105 receives the ARP reply, the bot server 105 may begin to send network data intended for the destination device to the controller 125.

In other embodiments, a policy within the policy engine 350 may indicate which IP addresses are bot servers 105. Whenever a bot server 105 sends network data for the first time to a network device 115, the bot server 105 may transmit an ARP request. The network data identifying the source IP address is copied by the tap 120 and the policy within the policy engine 350 can flag the source IP address as a bot server 105. Thereafter, the interceptor module may store the ARP request, and provide the controller 125 MAC address in an ARP reply to the switch and/or the bot server 105. Once the switch and/or the bot server 105 receives the controller 125 MAC address in the ARP reply, the IP address of the digital device (e.g., network device 115) will be associated with the controller 125 MAC address (e.g., in memory storage or cache). Network data intended for the network device 115 may then be transmit from the bot server 105 to the controller 125.

The bot server 105 may send the network data to any number of digital devices. Before the attack can proceed, the bot server 105 may send a separate ARP request for the IP address of every other digital device the malware wishes to send data to. The controller 125 detects and responds to each ARP request by sending an ARP reply to each request with the controller 125 MAC address. The controller 125 MAC address may be associated with the IP address of the other digital devices on a table within the bot server 105, switch, and/or server (not depicted). The table may be within memory, storage, buffered, and/or cached. As a result, network data transmitted by the bot server 105 to multiple network devices 115 may be intercepted by the controller 125.

Once the network data is intercepted, the network data is re-routed to the virtual machine, as discussed herein. Because the network data is re-routed, the actual machine or the network device 115 for which the network data is intended may not receive the network data and is, as a result, unaffected. A plurality of the network data can be re-routed to more than one virtual machine at one time (e.g., in parallel.) Thus, if the network data intended for a plurality of the network devices 115 is flagged as suspicious, or as coming from the device that has previously been deemed suspicious (e.g., the bot server 105), the interceptor module can select a plurality of virtual machines on which to test the suspicious network data.

The policy engine 350 may scan network data to detect unauthorized activity (e.g., including some bot related activity) based upon an unauthorized activity signature. In some embodiments, the policy engine 350 retrieves the unauthorized activity signature from the signature module 345. The network data is then scanned for unauthorized activity based on the unauthorized activity signature. The policy engine 350 can also flag network data as suspicious based on policies, as discussed herein.

Although FIG. 3 depicts various modules comprising the controller 125, fewer or more modules can comprise the controller 125 and still fall within the scope of various embodiments.

Figure 4:
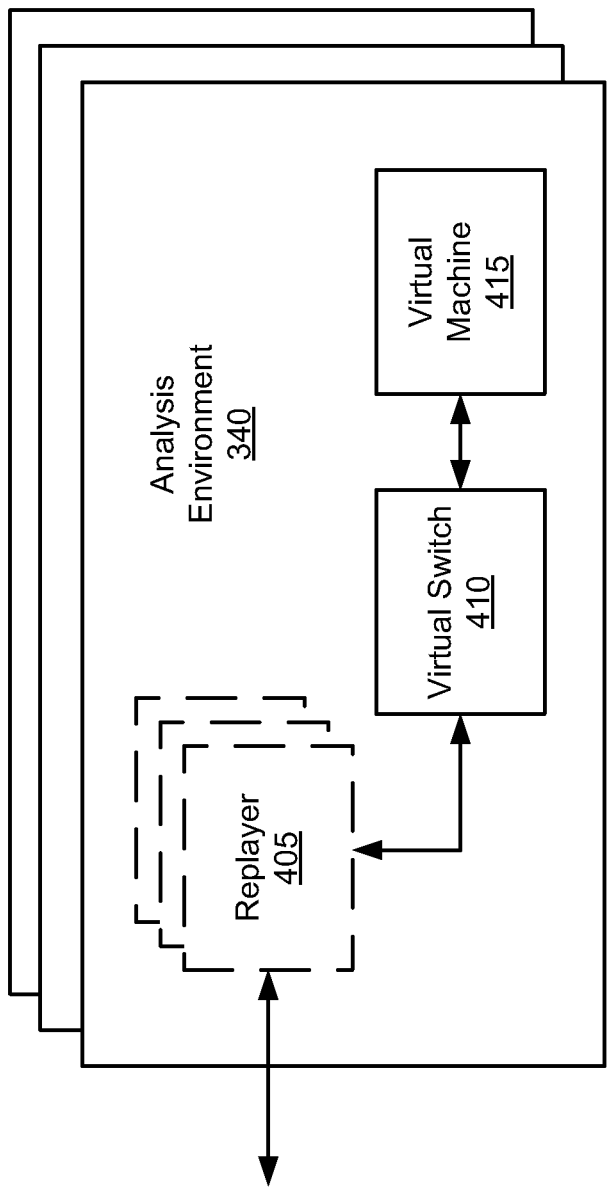
FIG. 4 is a block diagram of an exemplary analysis environment, in accordance with some embodiments of the present invention.

FIG. 4 is a block diagram of an exemplary analysis environment 340, in accordance with some embodiments of the present invention. The analysis environment 340 comprises a replayer 405, a virtual switch 410, and a virtual machine 415. The replayer 405 is a module that receives network data that has been flagged by the heuristic module 320 and replays the network data in the analysis environment 340. In some embodiments, the replayer 405 mimics the behavior of the infected bot server 105 in transmitting the flagged network data. There can be any number of replayers 405 simulating the transmission of network data between nodes on the communication network (e.g., the bot server 105 and the network device 115). In a further embodiment, the replayer 405 dynamically modifies session variables, as is appropriate, to emulate a "live" client or server of the protocol sequence being replayed. In one example, dynamic variables that may be dynamically substituted include dynamically assigned ports, transaction IDs, and any other variable that is dynamic to each protocol session. In other embodiments, the network data received from the heuristic module 205 is transmitted to the virtual machine 415 without a replayer 405.

The virtual switch 410 is a module that is capable of forwarding packets of flagged network data to the virtual machine 415. The virtual switch 410 simulates network device 115. The virtual switch 410 can route the data packets of the data flow to the correct ports of the virtual machine 415.

The virtual machine 415 is a representation of the network device 115 that can be provided to the analysis environment 340 by the scheduler 325. In one example, the scheduler 325 retrieves a virtual machine 415 from the virtual machine pool 335 and configures the virtual machine 415 to mimic the network device 115. The configured virtual machine 415 is then provided to the analysis environment 340 where it can receive flagged network data from the virtual switch 410.

As the analysis environment 340 simulates the transmission of the network data, behavior of the virtual machine 415 can be closely monitored for unauthorized activity. If the virtual machine 415 crashes, performs illegal operations, performs abnormally, or allows access of data to an unauthorized computer user, the analysis environment 340 can react.

In exemplary embodiments, virtual machines may be used to detect C&C channels and botnet infected systems using the C&C channels. C&C channel detection may occur in a replay virtual machine environment or in a direct entry virtual machine environment. While replay virtual analysis of virtual machines may be leveraged to extract C&C channel information, this may not be possible for all infection protocols. For infections protocols that can be replayed to result in a full bot infection, this technique may yield positive results. For infection protocols that do not go proceed to completion due to an inability to effectively replay unknown worms protocols, for example, the replay environment may not result in a full infection of the virtual machine 415. This may result in a denial of C&C channel information extraction, which will only become evident post-infection. In those instances, the analysis environment 340 may flag the devices involved in the suspected C&C channel as possibly infected with a bot and continue to track the nodes that communicate with those devices that participate within the suspected C&C channel.

Passive replay virtual machine environments may be effective for C&C channel discovery, since a passive worm may introduce no new worm protocol. Instead, a passive worm may merely piggyback on an existing protocol. Therefore, the existing passive worm replay may be adequate to detect a full bot infection. Passive replay of, for example, web based exploits may be extended to result in full infection and extraction of C&C channel information. Direct entry virtual machine environments are effective in extracting C&C channel information, since there is no need to replay an unknown worm protocol.

In some embodiments, the analysis environment 340 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 340 monitors and analyzes the behavior of the virtual machine 415 in order to determine a specific type of malware or the presence of an illicit computer user. The analysis environment 340 can also generate computer code configured to eliminate new viruses, worms, bots, or other malware. In various embodiments, the analysis environment 340 can generate computer code configured to identify data within the network data indicative of a malware attack, repair damage performed by malware, or the illicit computer user. By simulating the transmission of suspicious network data and analyzing the response of the virtual machine, the analysis environment 340 can identify known and previously unidentified malware and the activities of illicit computer users before a computer system is damaged or compromised.

Once the virtual machine is infected, via either replay or direct entry, the environment can wait for an outbound domain name system (DNS) request. The requested name in the DNS request is likely a C&C channel. A pseudo-DNS server in the virtual machine environment can respond to this request with an IP address mapped to an internal-to-virtual machine-analysis pseudo-server. If an outbound IRC or web request is made to the supplied IP address, then this confirms the existence of the C&C channel.

In some embodiments, all outbound DNS requires may be logged in a circular buffer (not shown). Once a C&C channel DNS name is identified, a search may be performed on all entries in the buffer for other source IP addresses that have requested the same DNS name. These source IP addresses are now highly suspect to be infected with the same bot or malware family that infected the virtual machine, even though these other IP addresses may not have been acknowledged as propagating an infection.

Once a C&C DNS name is discovered, the name may be communicated to all other devices as well as a cloud server. This allows other distributed devices to detect attempts to connect to the same C&C channel.

Figure 5:
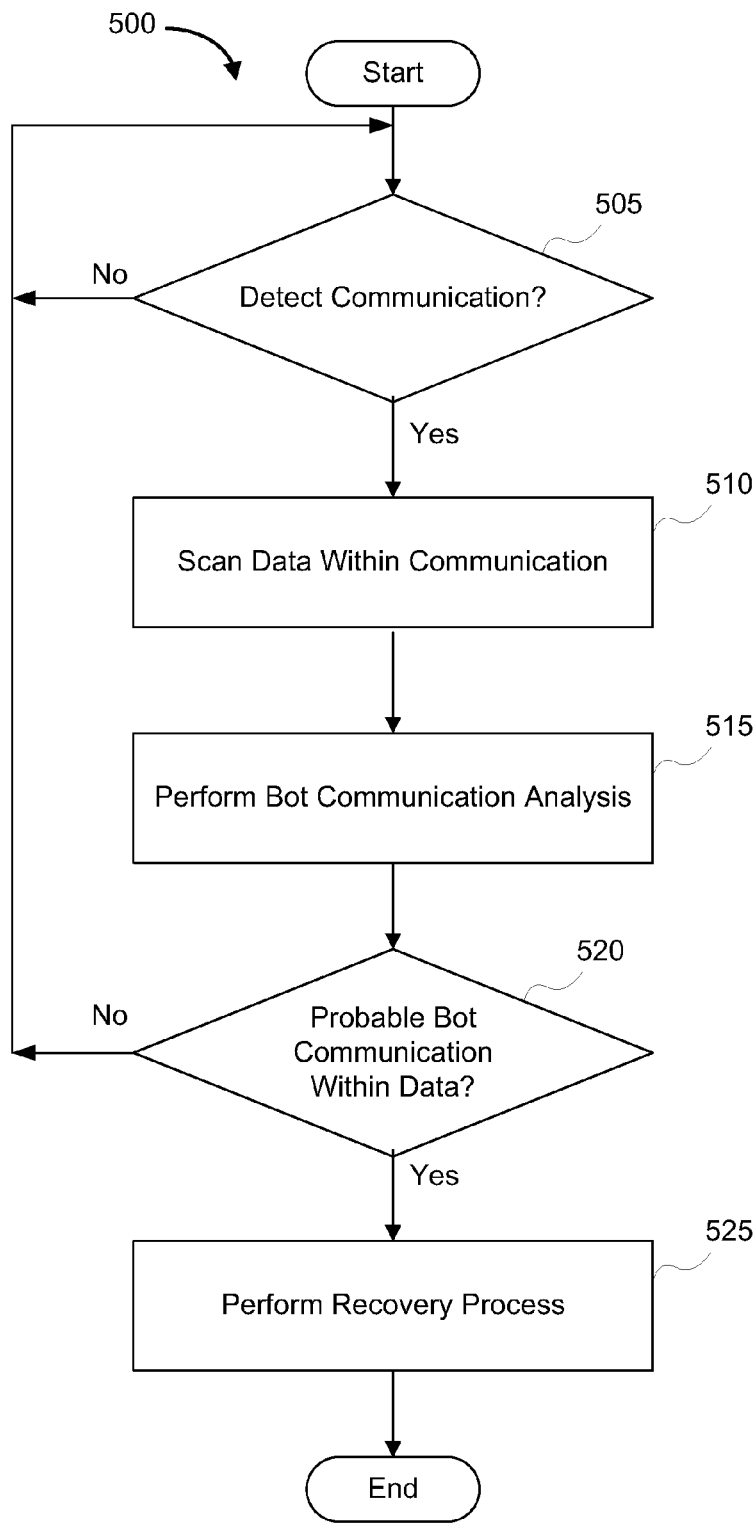
FIG. 5 is a flowchart of an exemplary method for detecting a C&C channel of a bot.

FIG. 5 is a flowchart 500 of an exemplary method for detecting a C&C channel of a bot. In step 505, the system (e.g., controller 125 and/or bot detector 200) determines if there is communication detected in the communication network 110. The determination may be performed, in accordance with some embodiments, by the tap 120, the bot detector 200, and/or the controller 125. If there is communication detected, then in step 510, data within the communication may be scanned. In one embodiment, the data may be copied. For example, the network data from the network device 115 to the bot server 105 may be copied by the tap 120. The network data is then sent from the tap 120 to the controller 125 for analysis. In an alternative embodiment, the data may be scanned directly by, for example, the bot detector 200.

In step 515, a bot communication analysis is performed. As discussed herein, the bot detector 200 or the controller 125 may utilizes various modules (e.g., protocol fingerprint module 305, heuristic module 320, and analysis environment 340) to determine whether the copied network data contains a possible bot communication or may otherwise be potentially harmful to the network device 115 for which the copied network data may be intended. Subsequently, suspicious nodes can be flagged. If the controller 125 or bot detector 200 does not identify the copied network data as possibly containing a possible bot communication, the network data may be transmitted to the intended destination (e.g., network device 115).

As described herein, several different methods may be utilized to detect a C&C communication within a channel on the communication network 110. In one embodiment, a fingerprint module 205 or 305 may scans for a bot oriented command in an IRC channel including IRC channel establishment commands or messages.

In an alternative embodiment, a port module 215 may monitor the use of non-standard ports. During base-lining a list of standard ports is compiled. Communications not originating from a standard port may be considered non-standard or an anomaly. As such, associated nodes may be flagged (e.g., color coded) and tracked.

In a further embodiment, a virtual machine may be utilized to detect C&C communication channels. The C&C communication channel detection may occur in a replay virtual machine environment or in a direct entry virtual machine environment. Accordingly, a virtual machine is retrieved which is used to mimic the network device 115. Intercepted or replayed network data obtained from the communication channel is transmitted to the virtual machine. The virtual machine response is then analyzed to determine if the virtual machine is infected. In some embodiments, the analysis environment 340 may wait for an outbound domain name system (DNS) request, which likely identifies the C&C channel. A pseudo-DNS server in the virtual machine can respond to the request with an IP mapped to an internal-to-virtual machine-analysis pseudo-server. If the outbound IRC or web request is made to the supplied IP address, then this confirms a C&C channel.

If a suspected bot communication is detected in step 520, then a recovery process may be performed in step 525. In one embodiment, the associated devices may be flagged and/or proper users and administrators notified. For example, any nodes that are not associated with any infection propagation may be placed in a yellow category. Nodes in an IRC or P2P network where at least one of the nodes (e.g., in a chain of nodes) is observed propagating an infection may be placed in, for example, an orange category. Nodes that are observed to be actively propagating an infection may be placed in a red category. Any nodes that have not been categorized as yellow, orange, or red may be assigned to a green category.

In another embodiment, a router (i.e., switch) may be configured to direct all data received from the bot server 105 (e.g., from the source IP address of the bot server 105) to the controller 125. As a result, all the network data from the bot server 105, not only that which is transmitted to the network device 115, may be intercepted.

Figure 6:
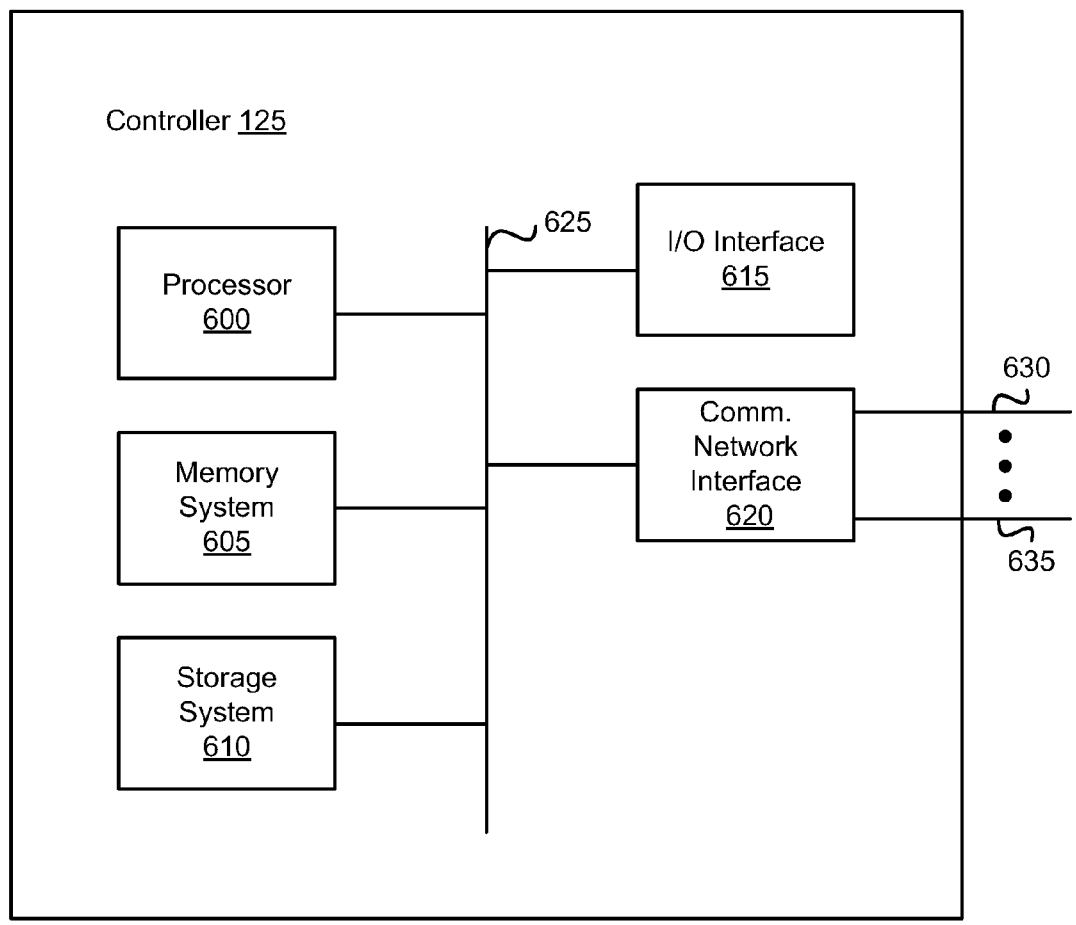
FIG. 6 is a block diagram of the controller, in accordance with one embodiment of the present invention.

FIG. 6 is a block diagram of the controller 125, in accordance with one embodiment of the present invention. The controller 125 comprises a processor 600, a memory system 605, a storage system 610, an I/O interface 615, and a communication network interface 620 which are all coupled to a system bus 625. The processor 600 is configured to execute executable instructions. In some embodiments, the processor 600 comprises circuitry or any one or more processors capable of processing the executable instructions.

The memory system 605 is any memory configured to store data. Some examples of the memory system 605 include storage devices, such as RAM or ROM.

The storage system 610 is any storage configured to retrieve and store data (e.g., a computer readable medium). Some examples of the storage system 610 are flash drives, hard drives, optical drives, and/or magnetic tape. The storage system 610 can comprise a database or other data structure configured to hold and organize data (e.g., network data, copies of network data, buffered data.) In some embodiments, the controller 125 includes memory in the form of RAM and storage in the form of flash data. The memory system 605 and/or the storage system 610 can comprise cache and buffers configured to retain network data or copies of network data.

The input/output (I/O) interface 615 is any device that can receive input and provide output to a user. The I/O interface 615 can be, but is not limited to, a keyboard, a mouse, a touchscreen, a keypad, a biosensor, or floppy disk drive.

The communication network interface 620 can be coupled to any user device via the link 630 through link 635. The communication network interface 620 may support communication over a USB connection, a firewire connection, an Ethernet connection, a serial connection, a parallel connection, or an ATA connection. The communication network interface 620 may also support wireless communication (e.g., 802.11 a/b/g/n or wireless USB). It will be apparent to those skilled in the art that the communication network interface 620 can support many wired and wireless standards.

Although only two links (630 and 635) are depicted in FIG. 6, there may be any number of links. In various embodiments, there may be one link 630 used by the tap 120 to transparently copy network data from the communication network 110. The other links may be used by the controller 125 to intercept data from one or more bot server 105 in parallel. In one example, the controller 125 comprises multiple IP addresses that may be broadcast from different links. Network data may be intercepted from different infected devices 105 by different links.

The above-described modules can be comprised of instructions that are stored on storage media (e.g., computer readable media). The instructions can be retrieved and executed by a processor (e.g., the processor 600). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

While various embodiments have been described above, it should be understood that they have been presented by way of example only, and not limitation. Thus, the breadth and scope of a preferred embodiment should not be limited by any of the above-described exemplary embodiments.

What is claimed is:

1. A method for detecting a communication channel of a bot, comprising:
   detecting a presence of the communication channel between a first network device and a second network device;
   scanning data associated with a data flow within the detected channel for a suspected bot communication, the scanning including analyzing content of the data associated with the data flow to detect whether the first network device is propagating malware;
   determining whether a potential bot communication exists within the data associated with the data flow;
   buffering at least a portion of the data associated with the data flow;

providing at least the portion of the data associated with the data flow to a first simulation module of a plurality of simulation modules to determine whether a bot communication exists;
generating an activity signature based on analysis by the first simulation module;
storing the activity signature for use in subsequent analyses; and
performing a recovery process when either the potential bot communication or the bot communication is detected, the recovery process including, determining one or more network devices that participated in communications using the communication channel operating as a command and control communication channel, the one or more network devices include at least the first network device.

2. The method of claim 1, wherein the data associated with the data flow comprises data obtained from a plurality of data packets forming the data flow.

3. The method of claim 1, wherein the recovery process further comprises redirecting all communications from the first network device to a virtual machine implemented within a controller that is scanning the detected channel.

4. The method of claim 1, wherein the determining the bot communication exists within data associated with the data flow comprises determining if the data that is within the data flow is directed to an unassigned Internet Protocol (IP) address.

5. The method of claim 1, wherein the determining the bot communication exists within data associated with the data flow comprises determining if the data that is within the data flow is directed to an unassigned or unusual port address.

6. The method of claim 1, wherein the determining the bot communication exists within data associated with the data flow comprises configuring a virtual machine with performance characteristics associated with the second network device targeted to receive the data associated with the data flow.

7. The method of claim 6, wherein the virtual machine is configured with the performance characteristics associated with the second network device and the performance characteristics include one or more ports that are to receive the data associated with the data flow.

8. The method of claim 6, wherein the virtual machine is configured with the performance characteristics associated with the second network device and the performance characteristics include one or more device drivers that are to respond to the received data associated with the data flow.

9. The method of claim 1, wherein the recovery processing includes categorizing the one or more network devices that participated in the communications, including placing the one or more network devices into one of at least, a first category corresponding to a first level of association with the communications and a second category corresponding to a second level of association with the communications, the second level representing a greater association than the first level.

10. The method of claim 1, wherein the activity signature includes one or more of (i) information to identify bot related behavior, known bot servers, suspected bot servers, (ii) mechanisms to block attacks, (iii) mechanisms to block bot propagation, or (iv) mechanisms that remove bots from network devices.

11. The method of claim 1, wherein detecting the presence of the communication channel between the first network device and the second network device includes detecting the communication channel operating in accordance with an Internet Relay Chat (IRC) protocol that corresponds to the command and control (C&C) communication channel, the IRC protocol having a tendency of being used for bot command and control.

12. The method of claim 1, further comprising:
notifying at least one of a user or a network administrator that either (i) the potential bot communication has been determined to exist within the data associated with the data flow, or (ii) the bot communication has been determined to exist within the data associated with the data flow.

13. The method of claim 1, wherein each of the plurality of simulation modules implements a virtual machine.

14. The method of claim 1, wherein the activity signature identifies one or more of (i) an unauthorized activity detected during analysis by the first simulation module, or (ii) the bot.

15. The method of claim 1 being performed by a controller that comprises a processor, a non-transitory machine-readable memory system and a communication network interface.

16. A controller comprising:
one or more processors; and
a storage device communicatively coupled to the one or more processors, the storage device including:
a first module that detects network data transmitted between a first network device and a second network device over a network,
a second module that scans at least a portion of the network data for suspicious activity, the scan including analyzing content of at least the portion of the network data,
a buffer for buffering at least the portion of the network data,
a plurality of simulation modules, each in communication with the second module, each simulation module comprises a virtual machine that is configured with one or more ports and capabilities, each simulation module to (i) receive at least the portion of the network data, (ii) monitor one or more subsequent responses of the virtual machine while processing at least the portion of the network data for unauthorized activity, and (iii) responsive to detecting the unauthorized activity, level generate an activity signature based on the detected unauthorized activity, and
a signature module that stores generated activity signatures.

17. The controller of claim 16, wherein the network data comprises data removed from the data flow.

18. The controller of claim 17, wherein the data flow comprises a plurality of data packets.

19. The controller of claim 16, wherein the first module further detects a presence of a command and control (C&C) communication channel between the first network device and the second network device.

20. The controller of claim 19, wherein the first module detects a presence of a channel operating in accordance with an Internet Relay Chat (IRC) protocol that corresponds to the C&C communication channel, the IRC protocol having a tendency of being used for bot command and control.

21. The controller of claim 20, wherein the second module includes a protocol fingerprint module that scans for commands or messages that indicate that the IRC channel is established, the commands or messages constitutes suspicious activity.

22. The controller of claim 20, wherein the second module includes a port module that monitors for communications originating from a non-standard port that constitutes suspicious activity.

23. The controller of claim 19 further performing a recovery process when, after scanning the network data for suspicious activity, a bot communication is detected, the recovery process includes determining one or more network devices that participated in communications associated with the C&C communication channel that routed the network data, including the first network device.

24. The controller of claim 23, wherein the recovery process further comprises redirecting all communications from the first network device to the virtual machine.

25. The controller of claim 23, wherein each simulation module, determines that the bot communication exists within the network data when the network data is directed to an unassigned Internet Protocol (IP) address.

26. The controller of claim 16, wherein each simulation module determines that a bot communication exists within the network data when the network data is directed to an unassigned or unusual port address.

27. The controller of claim 16, wherein the virtual machine of each simulation module is configured with performance characteristics associated with the second network device targeted to receive the network data.

28. The controller of claim 16, wherein the virtual machine of each simulation module is configured with performance characteristics associated with the second network device and the performance characteristics include one or more ports that are to receive the network data.

29. The controller of claim 16, wherein the virtual machine of each simulation module is configured with performance characteristics associated with the second network device and the performance characteristics include one or more device drivers that are to respond to the detected network data.

30. The controller of claim 16, wherein the activity signature includes one or more of (i) information to identify bot related behavior, known bot servers, suspected bot servers, (ii) mechanisms to block attacks, (iii) mechanisms to block bot propagation, or (iv) mechanisms that remove bots from network devices.

31. The controller of claim 16, further comprising:
notifying at least one of a user or a network administrator that either (i) suspicious activity has been detected based on analyzing the content of at least the portion of the network data, or (ii) unauthorized activity has been detected by monitoring one or more subsequent responses of the virtual machine while processing at least the portion of the network data.

32. The controller of claim 16, wherein each of the plurality of simulation modules implements a virtual machine.

33. The controller of claim 16, wherein the activity signature identifies one or more of (i) the unauthorized activity, or (ii) a bot associated with the unauthorized activity.

34. A controller comprising:
a processor; and
a storage system in communication with the processor, the storage system includes a bot detection logic that, when executed by the processor, (i) detects a presence of a communication channel that permits control of a network device without authorization by a user of the network device, (ii) buffers at least a portion of the data routed over the communication channel, (iii) provides at least the portion of the data to a first simulation module of a plurality of simulation modules, (iv) analyzes, by the first simulation module, at least a response of a virtual machine associated with the first simulation module based on processing of at least the portion of the data, and (v) generates and stores an activity signature based on analysis by the virtual machine for use in subsequent analyses.

35. The controller of claim 34, wherein the storage system further comprises a recovery process that, when executed by the processor, performs a recovery process, the recovery process includes determining one or more network devices that participated in communications associated with a command and control communication channel that routed the network data, including the first network device.

36. The controller of claim 34, wherein the data comprises one or more data flows, the one or more data flows include a plurality of data packets.

37. The controller of claim 34, wherein the at least the portion of data comprises data obtained from one or more data flows, the one or more data flows include a plurality of data packets that are transmitted over a network.

38. The controller of claim 34, further comprising:
performing a recovery process when the presence of the communication channel that permits control of the network device without authorization by the used is detected, wherein the recovery process includes categorizing one or more network devices into a first category corresponding to a first level of association with communication over the communication channel and a second category corresponding to a second level of association with communication over the communication channel, the second level representing a greater association than the first level.

39. The controller of claim 34, wherein the activity signature includes one or more of (i) information to identify bot related behavior, known bot servers, suspected bot servers, (ii) mechanisms to block attacks, (iii) mechanisms to block bot propagation, or (iv) mechanisms that remove bots from network devices.

40. The controller of claim 34, wherein the bot detection logic that, when executed by the processor detects the presence of the communication channel between the first network device and the second network device includes detecting the communication channel operating in accordance with an Internet Relay Chat (IRC) protocol that corresponds to a command and control (C&C) communication channel, the IRC protocol having a tendency of being used for bot command and control.

41. The controller of claim 34, further comprising:
notifying at least one of the user of the network device or a network administrator that the presence of the communication channel that permits control of the network device without authorization by the user of the network device has been detected.

42. The controller of claim 34, wherein each of the plurality of simulation modules implements a virtual machine.

43. The controller of claim 34, wherein the activity signature identifies one or more of (i) an unauthorized activity detected during analysis by the first simulation module, or (ii) a bot associated with the communication channel.

* * * * *